March 27, 1928.                                                                1,664,089
C. RINGWALD
THERMOSTATIC CONTROL FOR GENERATORS
Filed Feb. 23, 1926
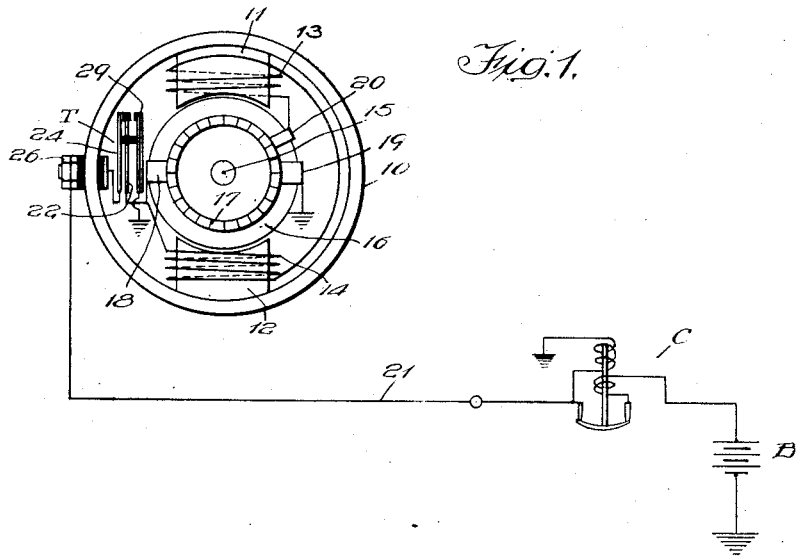
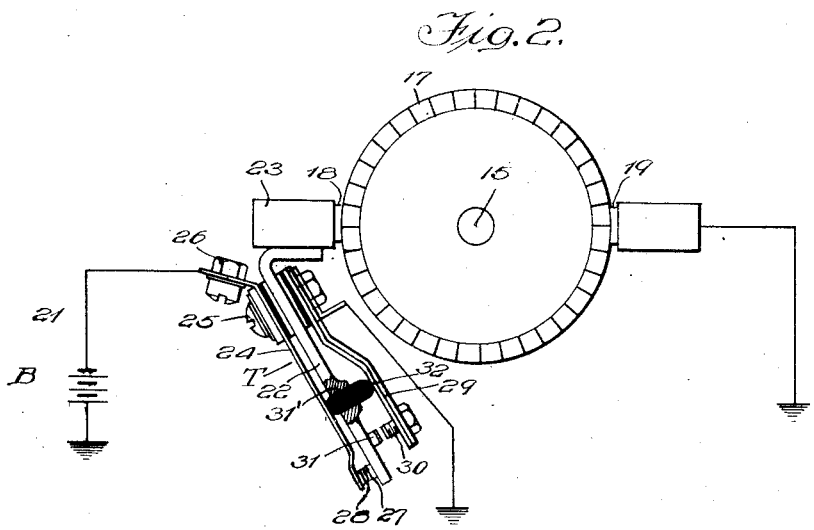
Inventor
Clarence Ringwald Patented Mar. 27, 1928.

1,664,089

UNITED STATES PATENT OFFICE.

CLARENCE RINGWALD, OF CHICAGO, ILLINOIS, ASSIGNOR OF ONE-HALF TO CHARLES H. CAINE, OF CHICAGO, ILLINOIS.

THERMOSTATIC CONTROL FOR GENERATORS.

Application filed February 23, 1926. Serial No. 89,862.

My invention relates to thermostatic control which is adapted for general application in connection with generators, but which is particularly useful in connection with the generators used in automotive vehicle electrical systems. The important object is to provide circuit arrangement thermostatically controlled preferably by the temperatures within the generator to interrupt the generator output and to then provide a low resistance or short circuit for permitting the generator to idle along under no load condition until the temperature falls off to a safe point for efficient operation, whereupon the generator will again be connected for charging service.

On the drawing which shows a practical embodiment of my invention,

Figure 1 more or less diagrammatically represents a generator and charging circuit together with my improved thermostatic controlling arrangements; and Fig. 2 is an enlarged view of the commutator end of the generator showing a preferred arrangement for supporting the thermostatic controlling device within the generator housing to be subjected to and under the influence of the heat generated within the housing during full load operation of the generator.

As shown in Figure 1, the field frame 10 forms an enclosure for the generator operating parts and supports the opposed field poles 11 and 12 on which are the field coils 13 and 14. The shaft 15 supports the armature 16 and the commutator 17, the commutator being engaged by the brushes 18 and 19. The field coils are shown connected serially in a circuit between one of the brushes 18 and a third brush 20 adjustable along the commutator to subject the field circuit to the full or only partial voltage of the generator.

The brush 19 is shown connected to ground and the other brush 18 is connected with the charging circuit 21 under control of the thermostatic mechanism designated as a whole T. In the charging circuit is shown the battery B which is to be charged, an auto-cutout C being also shown diagrammatically in the circuit.

The thermostatic controller T may be mounted upon the field frame or the poles or any suitable part of the generator, preferably within the field frame. I prefer to mount the controller T upon a brush holder, but this may be varied.

Referring particularly to Figure 2, the thermostat device T, there shown in detail, comprises a support or main contact arm 22 which may be secured to the holder 23 for the brush 18 to be then electrically connected with the brush. A contact spring 24 is secured at one end to the support 22 by a screw 25, but is insulated from the support. By means of the terminal screw 26, the contact spring 24 is connected with the charging circuit.

At their outer ends the support 22 and spring 24 have the contacts 27 and 28, respectively, which are normally in engagement to connect the generator with the charging circuit. On the opposite side of the support 22 is secured the thermostat element 29 which may be a bi-metal strip secured at one end by the screw 25 to the support 22 but insulated therefrom. At its outer end the thermostat element carries the adjustable contact 30 which cooperates with the contact 31 on the support 22. The support 22 has the transverse passageway 31' for the insulated abutment pin 32 which extends between the thermostat element and the spring 24.

The thermostat device is subjected to the temperature within the generator frame. Under ordinary operation of the generator, the temperature will be normal and the thermostat element 29 will be in position to disengage its contact 30 from the contact 31 on the support 22 and to release its pressure against the pin 32 so that the contacts 27 and 28 may engage to connect the generator with the charging circuit. If, for any reason, for example, continuous charging at a relatively high rate or charging at an excessively high rate the temperature of the generator rises to a dangerous point, the thermostat element 29 will be deflected to first exert sufficient pressure against movement of the pin 32 to cause disconnection of the contacts 27 and 28 and thereby interruption of the charging circuit, and then to bring contacts 30 and 31 into engagement to thus connect the brush 18 directly with ground and to thereby close a short circuit around the generator, armature and field frame. Under such short circuit, the generator merely idles along as under no load condition, and as soon as the temperature drops back towards normal, the thermostat element 29 will reopen the short circuit and reconnect the generator in the charging circuit. When the short circuit is closed, there will be a momentary charge of high current flow through the short circuit, but as the thermoresponsive element is included in this circuit any additional heat caused therein will merely assist the element in holding the short charging circuit open and keeping the short circuit closed. In addition to the specific mode of operation above described, I may proportion the parts and clearances in such manner that the shunt to ground at contacts 30, 31 may be closed in advance of opening of the contacts 28, 27, so that the latter contacts may be opened on a dead circuit.

If the contacts 28, 27 open slowly while current is flowing there may be considerable burning of the contacts. The latter mode of operation, namely, first closing contacts 29, 30 and then opening contacts 27, 28 will permit the latter contacts to open on a dead circuit and likewise the contacts 29, 30 will also normally open on a dead circuit.

If any arcing does occur at points 27, 28 it tends to heat up said contacts and to hasten the closing of contacts 30, 31.

The thermostatic spring 29 may be placed between members 22 and 24 so that full advantage may be taken of such acceleration of the thermostatic element due to heat generated by the arc. The contacts 28 and 27 may then be separately adjustable and the spring 29 may have a fixed contact or contacts on its ends facing in opposite directions.

I claim:—

1. A unitary switch structure comprising a main switch element, a secondary switch element adapted for connection normally in electrical engagement with said main switch element, a heat responsive switch element, said heat responsive switch element and said main switch element being adapted to co-operate, and abutment means between said secondary switch member and said heat responsive element, said heat responsive element under normal temperature releasing said abutment member to permit engagement of said secondary and main switch elements, said heat responsive member responding to abnormal temperature to exert pressure against said abutment member to disconnect said secondary switch element from said main switch element, said heat responsive member then contacting with said main switch element.

2. A unitary switch structure comprising a contact member, a first contact spring adapted for connection with said contact member, a second contact spring responsive to temperature changes and adapted for engagement with said contact member, and an interconnecting member between said springs, said first spring under normal heat conditions engaging with said contact member and acting through said interconnecting member to hold said heat responsive spring away from said contact member, and the heat responsive contact member acting under abnormal heat conditions to disconnect said first spring from said contact member and to engage said contact member.

3. In a unitary switch structure, the combination of a main contact member, an auxiliary contact member, a heat responsive contact member, said auxiliary contact member under normal heat conditions engaging said main contact member and said heat responsive member being disconnected from said main contact member, and means whereby said heat responsive contact member will act under abnormal heat conditions to positively disconnect said auxiliary contact member from the main contact member and to itself engage with said main contact member.

4. A unitary switch structure comprising a main switch member, a secondary switch spring, a heat responsive switch spring, a transmitting member between said springs and carried by said main switch member, said heat responsive spring when under normal temperature being out of contact with said main switch member and said secondary switch spring being in contact with said main switch member, said heat responsive spring when under abnormal temperature flexing to contact with said main switch member and shifting said transmitting member to engage with and disconnect said secondary switch spring from the main switch member.

In witness whereof, I hereunto subscribe my name this 19th day of February, 1926.

CLARENCE RINGWALD.